United States Patent
Pryor et al.

(10) Patent No.: US 11,622,062 B1
(45) Date of Patent: Apr. 4, 2023

(54) RUGGEDIZED MINIATURIZED INFRARED CAMERA SYSTEM FOR AEROSPACE ENVIRONMENTS

(71) Applicant: United States of America as represented by the Administrator of NASA, Washington, DC (US)

(72) Inventors: Jonathan Eugene Pryor, Madison, AL (US); Jeremy Dwight Myers, Taft, TN (US); Jarret Carl Bone, Madison, AL (US); Brent L. Beabout, Huntsville, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 36 days.

(21) Appl. No.: 17/222,533

(22) Filed: Apr. 5, 2021

(51) Int. Cl.
*G03B 17/56* (2021.01)
*G03B 15/00* (2021.01)
*H04N 5/225* (2006.01)

(52) U.S. Cl.
CPC ......... *H04N 5/2252* (2013.01); *G03B 15/006* (2013.01); *G03B 17/561* (2013.01); *G03B 17/566* (2013.01); *H04N 5/2254* (2013.01)

(58) Field of Classification Search
None
See application file for complete search history.

(56) References Cited

U.S. PATENT DOCUMENTS

| | | |
|---|---|---|
| 2,500,379 A | 3/1950 | Robinson |
| 3,520,238 A | 7/1970 | Webb |
| 4,945,367 A | 7/1990 | Blackshear |
| 5,162,906 A | 11/1992 | Yorita |
| 5,313,238 A * | 5/1994 | Kelley ............ G03B 3/02 396/89 |
| 5,422,484 A | 6/1995 | Brogi |
| 5,485,237 A | 1/1996 | Adermann |
| 5,637,871 A | 6/1997 | Piety |
| 5,675,149 A | 10/1997 | Wood |
| 5,763,882 A | 6/1998 | Klapper |

(Continued)

FOREIGN PATENT DOCUMENTS

| | | | | |
|---|---|---|---|---|
| UA | 145709 U | * | 12/2020 | |
| WO | WO-2021028009 A1 | * | 2/2021 | ........... H04N 5/2252 |

*Primary Examiner* — Quan Pham
(74) *Attorney, Agent, or Firm* — Jerry L. Seemann; Trenton J. Roche

(57) ABSTRACT

A ruggedized miniaturized infrared camera system for harsh environments has an infrared camera module that is connected to a ruggedized camera mount. The camera mount has a body and a lens clamp that clamps the camera lens to the body. The camera mount and military-spec fasteners cooperate to mechanically secure the camera module from vibrations. An interface bracket is attached to the camera mount and has a central opening. A signal connector is attached to the exterior side of the bracket and configured to carry USB2 signals. Conductive pins of the signal connector extend through the central opening and are electrically coupled to a circuit board that is adjacent to the interior side of the bracket. An electrically non-conductive spacer is within the central opening and interposed between the signal connector and circuit board. Heat-conductive epoxy secures the circuit board from vibrations and creates thermal bonds that passively remove heat.

16 Claims, 7 Drawing Sheets

(56) References Cited

U.S. PATENT DOCUMENTS

| | | | | |
|---|---|---|---|---|
| 6,014,522 | A | 1/2000 | Reber, II | |
| 6,115,559 | A | 9/2000 | Balling | |
| 6,715,940 | B2 | 4/2004 | Top | |
| 7,767,963 | B1 | 8/2010 | Fujii | |
| 10,277,786 | B1* | 4/2019 | Leonelli, Jr. | H04N 5/2254 |
| 2001/0055487 | A1 | 12/2001 | Akada | |
| 2002/0076962 | A1* | 6/2002 | Williams | H01R 13/627 |
| | | | | 439/188 |
| 2002/0121809 | A1* | 9/2002 | Kameyama | H02G 3/088 |
| | | | | 307/9.1 |
| 2008/0124069 | A1* | 5/2008 | Basho | G03B 27/58 |
| | | | | 396/427 |
| 2012/0154521 | A1* | 6/2012 | Townsend | H04N 5/23238 |
| | | | | 348/E5.026 |
| 2014/0317987 | A1* | 10/2014 | Kuehl | F16M 11/105 |
| | | | | 42/90 |
| 2015/0373267 | A1* | 12/2015 | Lapstun | G03B 37/04 |
| | | | | 348/144 |
| 2017/0155809 | A1* | 6/2017 | Sauer | B60R 1/12 |
| 2021/0364358 | A1* | 11/2021 | Tran | G01J 5/10 |

\* cited by examiner

RUGGEDIZED MINIATURIZED INFRARED CAMERA SYSTEM FOR AEROSPACE ENVIRONMENTS

ORIGIN OF THE INVENTION

The invention described herein was made by employees of the United States Government and may be manufactured and used by or for the Government of the United States of America for governmental purposes without the payment of any royalties thereon or therefor.

CROSS-REFERENCES TO RELATED PATENT APPLICATIONS

None.

TECHNICAL FIELD

The present invention relates to a ruggedized miniaturized infrared camera system configured for aerospace environments.

BACKGROUND

Infrared cameras are frequently used in aviation and space explorations. Aviation and space environments are harsh, often exhibiting extreme temperatures and high levels of radiation. Furthermore, in such environments, the infrared camera is subjected to severe vibrations especially upon takeoff of the aircraft or launch of the spacecraft. Such vibrations may continue and even increase in frequency and magnitude during flight. In addition to withstanding such harsh environments, the infrared camera must be able to meet specific imagery requirements such as video quality requirements. Conventional infrared cameras do not have the required configurations that allow the infrared camera to withstand the harsh environments of aerospace applications. For example, many conventional infrared cameras do not sufficiently remove heat in a vacuum, thereby shortening the operational life of the infrared camera. Such conventional infrared cameras also do not meet the requirements for off-gassing and vibration tolerance. Furthermore, many conventional infrared cameras utilize large non-rugged USB connectors or large non-military standard signal connectors thereby resulting in a large-sized camera frame or housing that exceeds maximum weight and/or volume requirements. Standard USB connectors were not designed for harsh environments. Finally, many infrared cameras require active cooling which results in large power and mass requirements.

What is needed is an improved miniaturized infrared camera system for aerospace applications that addresses the problems and deficiencies of conventional infrared cameras.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of a ruggedized miniaturized infrared camera system configured for aerospace environments are disclosed herein. The ruggedized miniaturized infrared camera system comprises a miniaturized infrared camera module that is integrated with a ruggedized camera mount to form a compact, integrated camera system. The infrared camera module comprises a lens and housing. Camera electronics are located within the housing. The housing includes an electrical connector that is in electrical signal communication with the camera electronics within the housing. The ruggedized camera mount comprises a body and a lens clamp member. The lens clamp member is removably connected to the body. The lens clamp member clamps the camera lens to the body of the ruggedized camera mount. Military-spec fasteners are used to mechanically connect the infrared camera module to the ruggedized camera mount. The ruggedized camera mount and military-spec fasteners cooperate to mechanically secure the infrared camera module from vibrations. An interface bracket is attached to the ruggedized camera mount. In an exemplary embodiment, the interface bracket is substantially "L" shaped. A first section of the interface bracket covers a portion of the camera housing. A second section of the interface bracket is substantially perpendicular to the first section and has an interior side, an exterior side and a central opening. An electrical signal connector is attached to the exterior side of the second section and is configured for handling various electrical signals including USB2 signals. A portion of the electrical signal connector is within the central opening. An electronic circuit board is located adjacent to the interior side of the second section. An electrically non-conductive spacer is positioned within the central opening and is interposed between the electrical signal connector and the electronic circuit board in order to maintain a gap between the electronic circuit board and the electrical signal connector. The electrically conductive pins of the electrical signal connector extend through the electrically non-conductive spacer and are electrically coupled to the electronic circuit board. The electronic circuit board passes through USB signals and provides regulated power to the camera electronics. Heat conductive epoxy is applied to the electronic circuit board to secure electronic components from vibrations and to create thermal bonds that passively remove heat. Electronic and mechanical components are strategically positioned to minimize mechanical gaps and reduce mass and volume. All mechanical and electronic components of the infrared camera system have relatively low contamination properties thereby eliminating or substantially reducing off-gassing and improving vacuum compatibility and optical clarity. The ruggedized miniaturized infrared camera system is able to withstand stringent launch load environments and low earth-orbit environments and is ideal for use on aircraft, rockets, space stations, satellites or cube-satellites.

In some embodiments, the ruggedized miniaturized infrared camera system for aerospace environments comprises a ruggedized camera mount comprising a base having a camera lens receiving surface that has a curvature that corresponds to the shape of a camera lens. The ruggedized camera mount further comprises a lens clamp member removably attached to the base and configured to clamp a camera lens to the base. The lens clamp member has a camera lens contact surface that is aligned with the camera lens receiving surface. When a camera lens is positioned on the camera lens receiving surface, the lens clamp member clamps the camera lens between the camera lens receiving surface and the camera lens contact surface. The ruggedized miniaturized infrared camera system further comprises a camera housing support structure comprising a bottom section attached to the base and a pair of upstanding wall sections attached to the bottom section. The upstanding wall sections are spaced apart so as to provide a space that is sized for receiving a housing of a camera. The space between the upstanding wall sections is aligned with the camera lens receiving surface. The ruggedized miniaturized infrared camera system further comprises a miniaturized infrared camera module comprising a lens and housing. The lens is clamped between the camera lens receiving surface and the camera lens contact surface. The housing is positioned within the space between the upstanding wall sections and attached to the camera housing support structure.

An exemplary embodiment of a ruggedized camera mount for aerospace environments is disclosed herein. The ruggedized camera mount comprises a base section having a camera lens receiving surface that has a curvature that corresponds to the shape of a camera lens and a lens clamp member removably attached to the base and having a camera lens contact surface. When a camera lens is positioned on the camera lens receiving surface, the lens clamp member clamps the camera lens between the camera lens receiving surface and the camera lens contact surface. The ruggedized camera mount further comprises a camera housing support structure comprising a bottom section attached to the base and a pair of upstanding sections attached to the bottom section and spaced apart so as to provide a space for receiving the housing of a camera. The space between the upstanding sections is aligned with the camera lens receiving surface.

DETAILED DESCRIPTION

As used herein, the terms "comprises", "comprising", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

Approximating language, as used herein throughout the specification and claims, may be applied to modify any quantitative representation that could permissibly vary without resulting in a change in the basic function to which it is related. Accordingly, a value modified by a term such as "about" or "approximately" is not limited to the precise value specified.

As used herein, terms such as "vertical", "horizontal", "top", "bottom", "upper", "lower", "middle", "above", "below" and the like are used for convenience in identifying relative locations of various components and surfaces relative to one another in reference to the drawings and that the ruggedized miniaturized infrared camera system disclosed herein may be installed and used in substantially any orientation so that these terms are not intended to be limiting in any way.

Reference in the specification to "an exemplary embodiment", "one embodiment" or "an embodiment" means that a particular feature, structure or characteristic described in connection with the embodiment is included in at least one embodiment of the invention. The appearances of the phrases "an exemplary embodiment", "one embodiment" or "embodiment" in various places in the specification are not necessarily all referring to the same embodiment.

Figure 1:
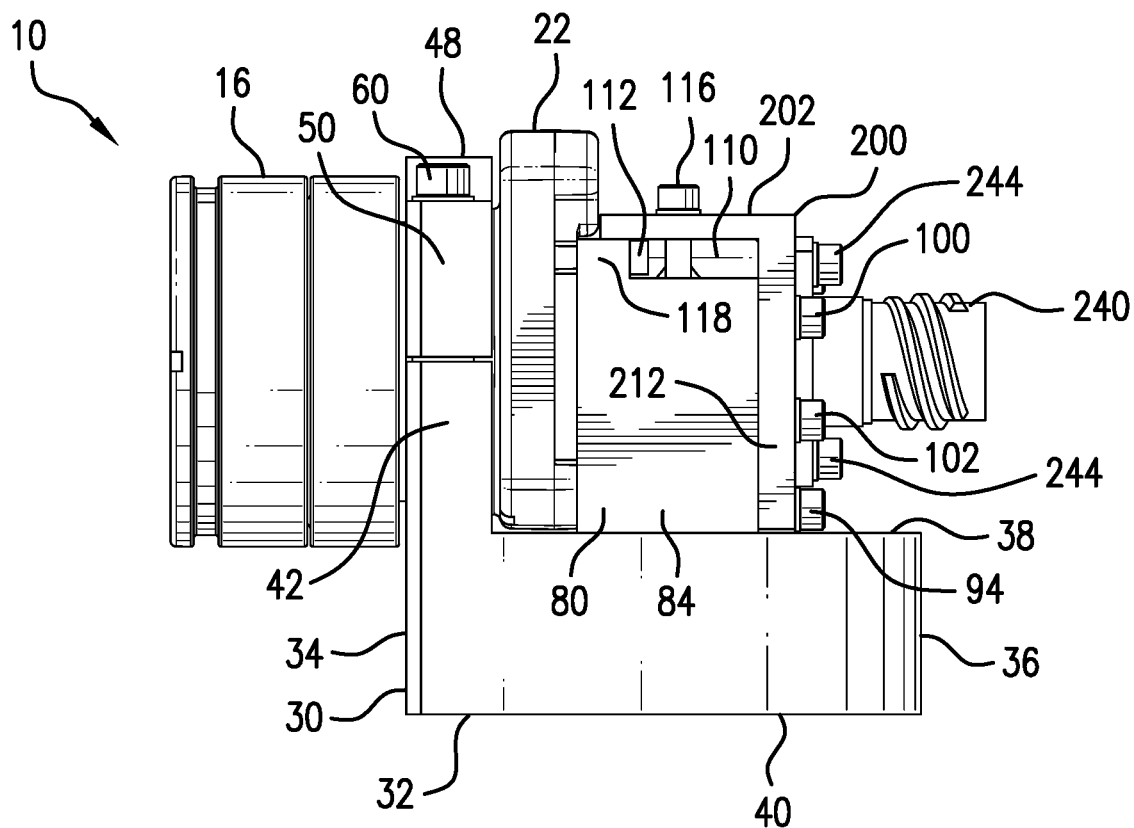
FIG. 1 is a left side elevational view of an exemplary embodiment of a ruggedized miniaturized infrared camera system for aerospace environments in accordance with an exemplary embodiment.
Figure 2:
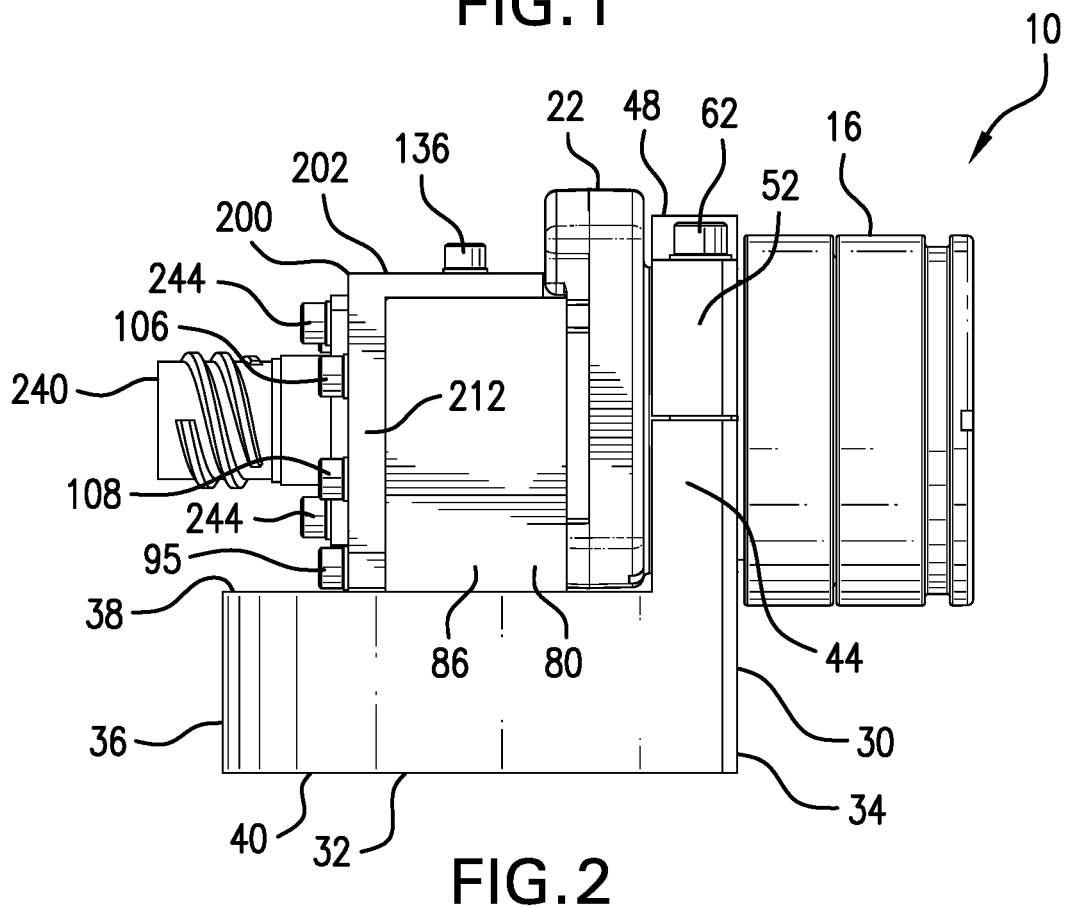
FIG. 2 is a right side elevational view of the ruggedized miniaturized infrared camera system.
Figure 5:
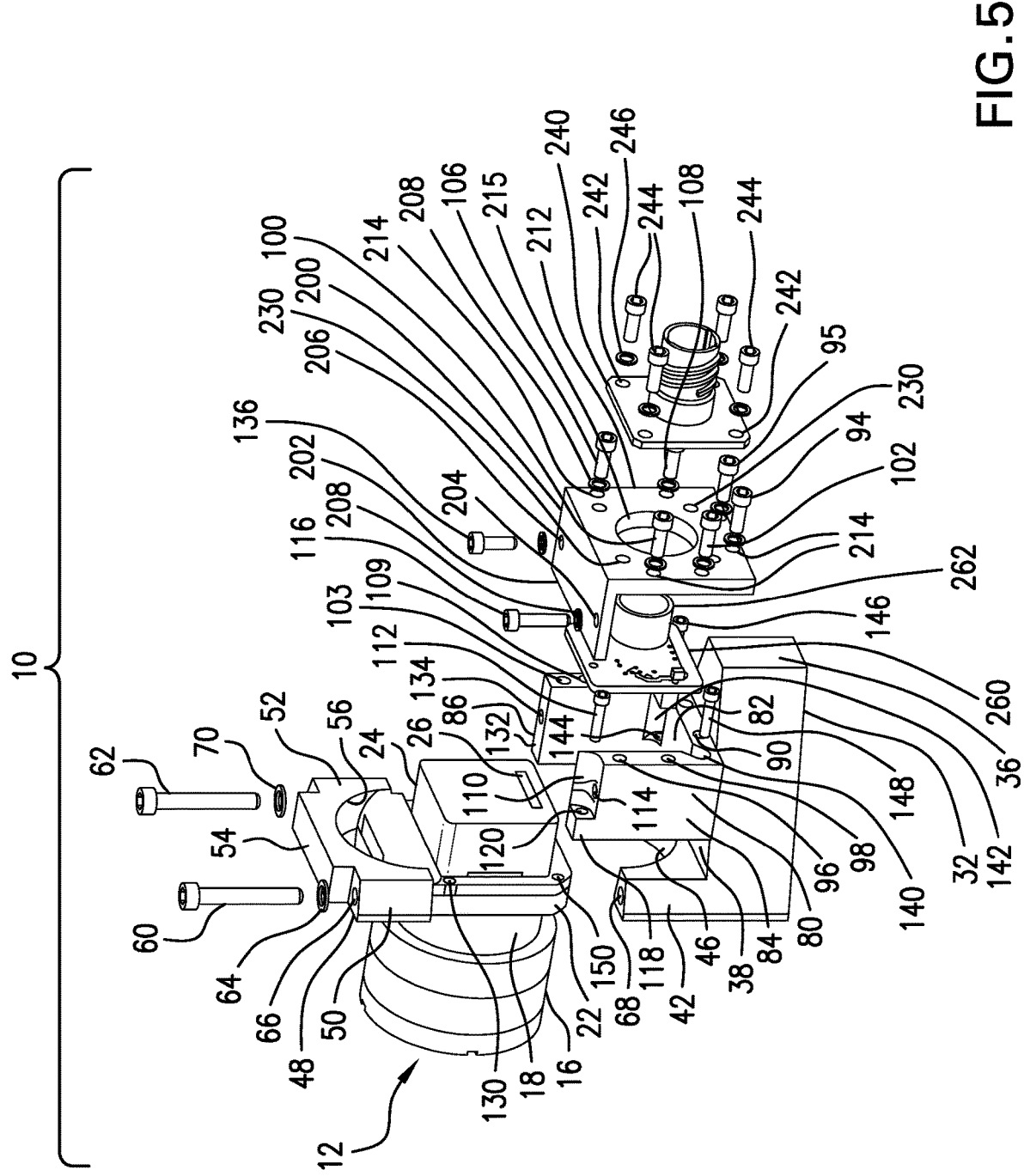
FIG. 5 is an exploded view, in perspective, of the ruggedized miniaturized infrared camera system.
Figure 6:
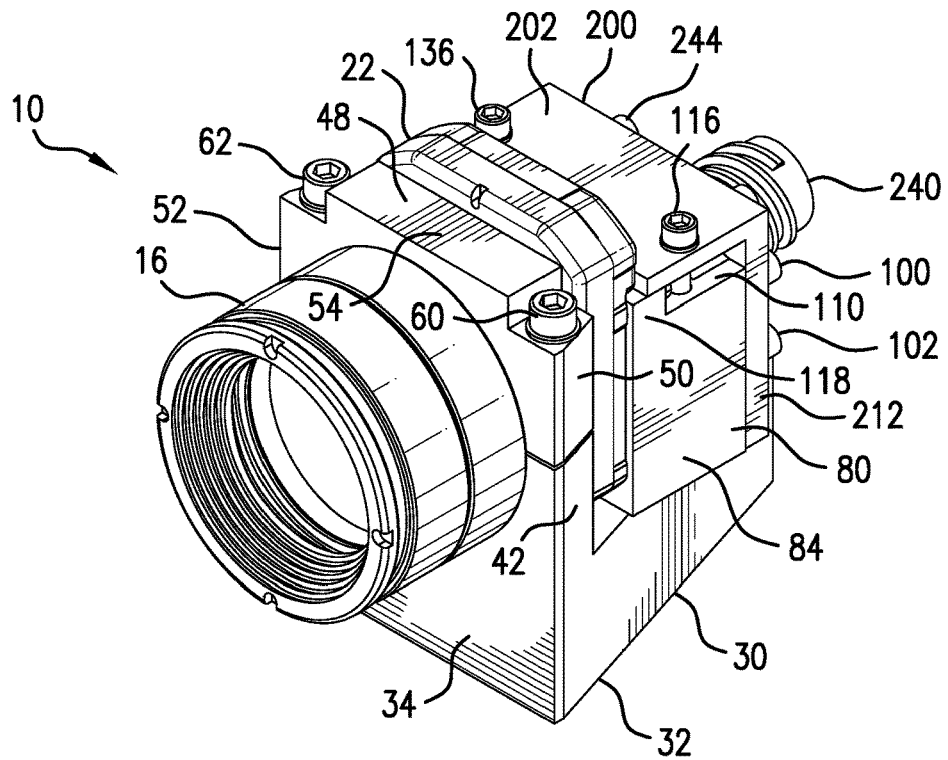
FIG. 6 is a perspective view showing the front and left sides of the ruggedized miniaturized infrared camera system.
Figure 7:
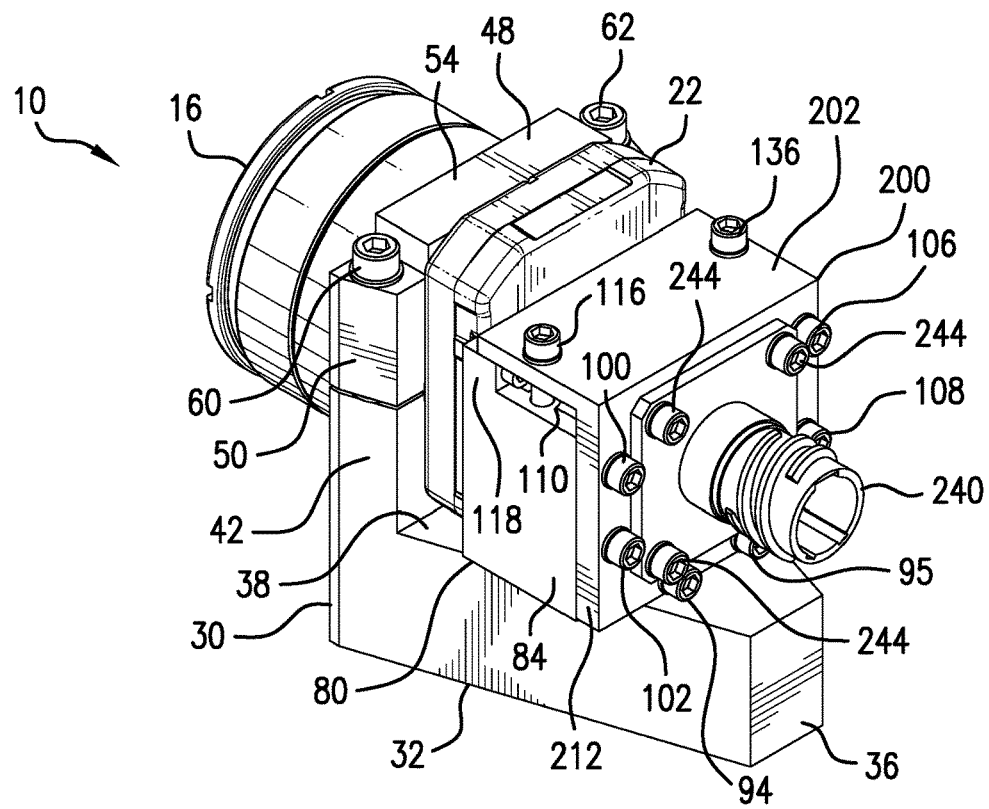
FIG. 7 is a perspective view showing the rear and left sides of the ruggedized miniaturized infrared camera system.

Referring to FIGS. 1, 2 and 5, there is shown ruggedized miniaturized infrared camera system 10 in accordance with an exemplary embodiment. Infrared camera system 10 comprises miniaturized infrared camera module 12. Infrared camera module 12 comprises lens 16. Lens 16 includes section 18 which has a diameter that is relatively smaller than the diameter of the remaining portion of lens 16. Section 18 of lens 16 is attached to camera housing 22. Camera housing 22 includes section 24 within which the camera electronics 25 (shown in phantom in FIG. 8B) are located. Section 24 includes electronic signal connector 26 that is in electronic signal communication with camera electronics 25. In an exemplary embodiment, infrared camera module 12 comprises the commercially available miniaturized Boson® Model No. 640 longwave infrared (LWIR) thermal camera module having a FURS 8.7 mm lens. The Boson® Model No. 640 camera module has a resolution of 640×512 and utilizes FLIR infrared video processing architecture. The Boson® Model No. 640 has an input voltage of 3.3 VDC, power consumption as low as 500 mW and is able to operate within the temperature range of −40° C. to +80° C. The Boson® Model No. 640 camera module is miniaturized and relatively smaller than the typical commercially available infrared camera and is therefore well-suited for applications having low-mass requirements. The Boson® Model No. 640 camera module is passively cooled and therefore does not require active cooling. This passive cooling feature simplifies the integration of the Boson® Model No. 640 camera module with an aircraft, spacecraft or other vehicle.

It is to be understood that the Boson® Model No. 640 infrared camera module is just one example of a suitable commercially available infrared camera module and that other commercially available infrared camera modules having substantially the same configuration and operating characteristics as the Boson® Model No. 640 infrared camera module may be used as well.

Referring to FIGS. 5, 8A, 9 and 10, ruggedized miniaturized infrared camera system 10 further comprises ruggedized camera mount 30. Ruggedized camera mount 30 comprises base portion 32 which has a generally "V" shaped geometry. Base portion 32 has front end 34, rear end 36, top side 38 and bottom side 40. Front end 34 comprises upstanding portions 42 and 44. Front end 34 further includes camera lens receiving surface 46. Camera lens receiving surface 46 has a curvature that corresponds to the shape or curvature of section 18 of lens 16. As shown in FIGS. 1 and 2, section 18 of lens 16 is positioned upon camera lens receiving surface 46. Ruggedized camera mount 30 further comprises lens clamp member 48. Lens clamp member 48 comprises side portions 50 and 52 and an intermediate portion 54. Lens clamp member 48 includes camera lens contact surface 56 therein that has a curvature that corresponds to the curvature or shape of section 18 of lens 16. Camera lens contact surface 56 physically contacts the curved surface of section 18 of lens 16. Camera lens contact surface 56 is aligned with camera lens receiving surface 46. In an exemplary embodiment, lens clamp member 48 is removably attached to upstanding portions 42 and 44 via screws 60 and 62. Screw 60 extends through washer 64 and through the through-hole 66 in side portion 50 and washer 67 and is threadedly engaged with threaded screw inlet 68 in upstanding portion 42. Similarly, screw 62 extends through washer 70 and the through-hole 72 in side portion 52 and washer 73 and is threadedly engaged with threaded screw inlet 74 in upstanding portion 44. When lens clamp member 48 is attached to upstanding portions 42 and 44 via screws 60 and 62, lens clamp member 48 tightly clamps the lens 16 to ruggedized camera mount 30. Specifically, lens clamp member 48 tightly clamps section 18 of lens 16 between camera lens receiving surface 46 and camera lens contact surface 56. In an exemplary embodiment, each screw 60 and 62 is fabricated from passivated stainless steel and is configured with a socket head. In an exemplary embodiment, each screw 60 and 62 is a military standard NAS1352N02 A286 Stainless Steel Socket Head Cap Screw. Each washer 64, 67, 70 and 73 is configured as a flat washer and fabricated from passivated stainless steel. In an exemplary embodiment, each washer 64, 67, 70 and 73 is a military standard NAS620C4 flat washer.

Referring to FIG. 5, ruggedized camera mount 30 further comprises camera housing support structure 80 that is attached or joined to top side 38 of base portion 32. In some embodiments, camera housing support structure 80 is integral with base portion 32. Camera housing support structure 80 has horizontal bottom section 82 and a pair of upstanding wall sections 84 and 86. Upstanding wall sections 84 and 86 are parallel to each other and attached to horizontal bottom section 82. Upstanding wall sections 84 and 86 are spaced apart so as to provide a space sized to receive section 24 of camera housing 22. As shown in FIG. 8B, section 24 of camera housing 22 is located between upstanding wall sections 84 and 86. Bottom section 82 has threaded screw inlets 90 and 92 for receiving screws 94 and 95, respectively. As will be discussed in the ensuing description, screws 94 and 95 are used to attach interface bracket 200 to camera housing support structure 80. Upstanding wall section 84 includes screw inlets 96 and 98. Screw inlets 96 and 98 are configured to receive screws 100 and 102, respectively. As will be discussed in the ensuing description, screws 100 and 102 are used to attach or join interface bracket 200 to camera housing support structure 80. Similarly, upstanding wall section 86 includes screw inlets 103 and 104. Screw inlets 103 and 104 are configured to receive screws 106 and 108, respectively. As will be discussed in the ensuing description, screws 106 and 108 are used to attach or join interface bracket 200 to camera housing support structure 80. Upstanding wall section 86 further comprises counter-bore opening 109 that is located between screw inlets 103 and 104. The purpose of counter-bore 109 is discussed in the ensuing description.

Figure 8A:
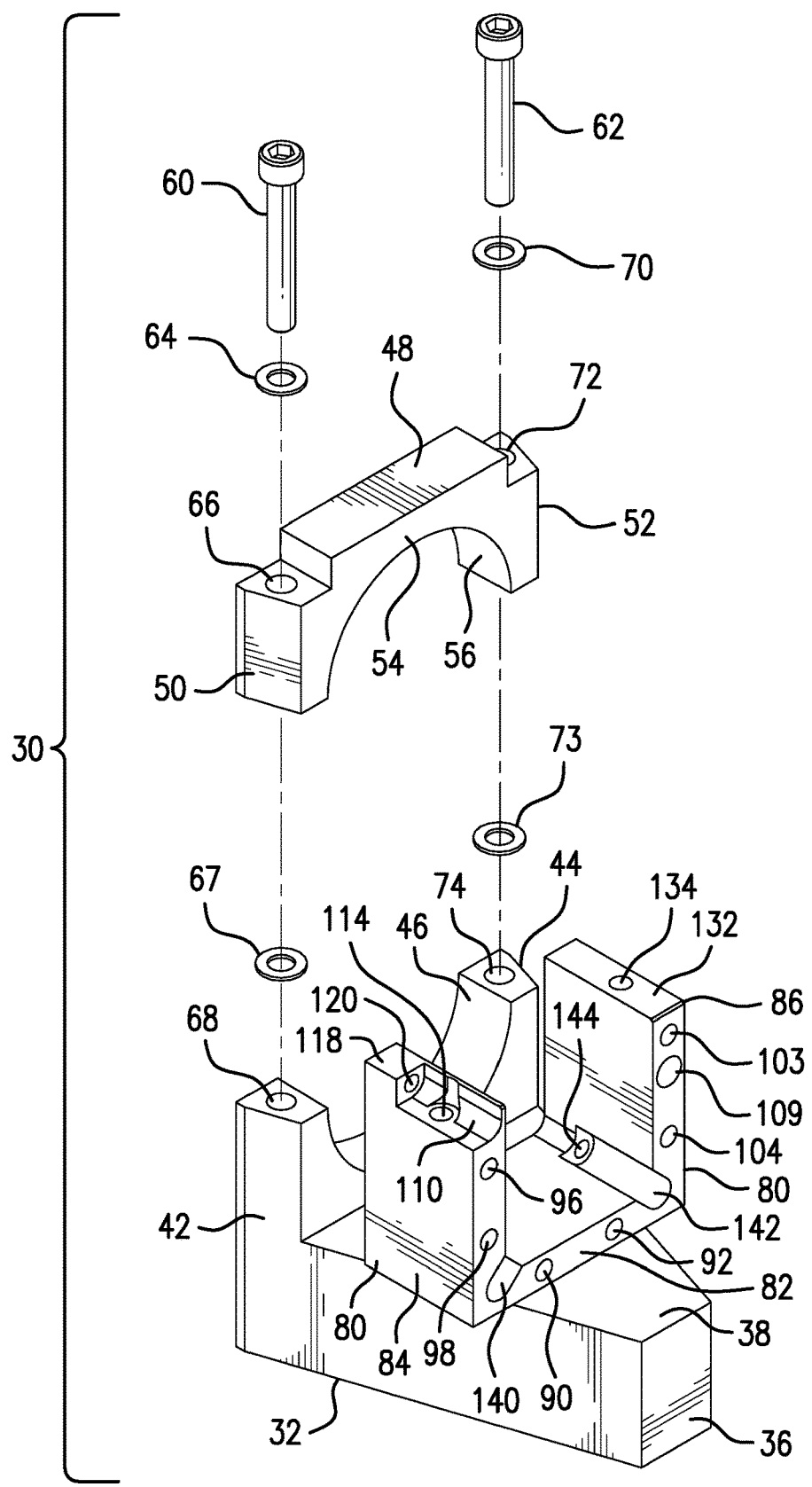
FIG. 8A is an exploded view, in perspective view, of a ruggedized camera mount shown in FIGS. 1, 2 and 5-7.
Figure 8B:
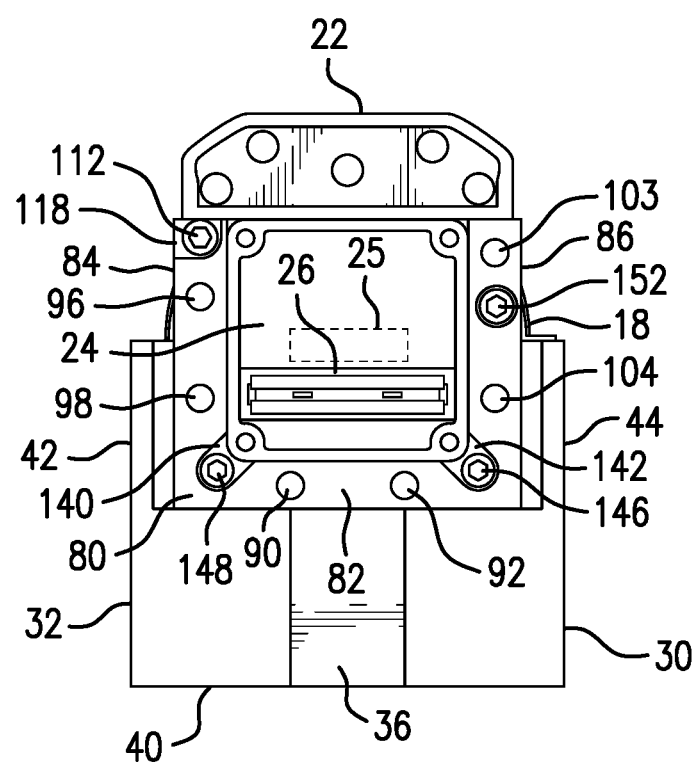
FIG. 8B is a rear view illustrating the miniaturized infrared camera module attached to the base of the ruggedized camera mount, the view not showing the lens clamp member and the interface bracket in order to facilitate viewing of the interconnection between the miniaturized infrared camera module and the camera housing support structure of the ruggedized camera mount.
Figure 9:
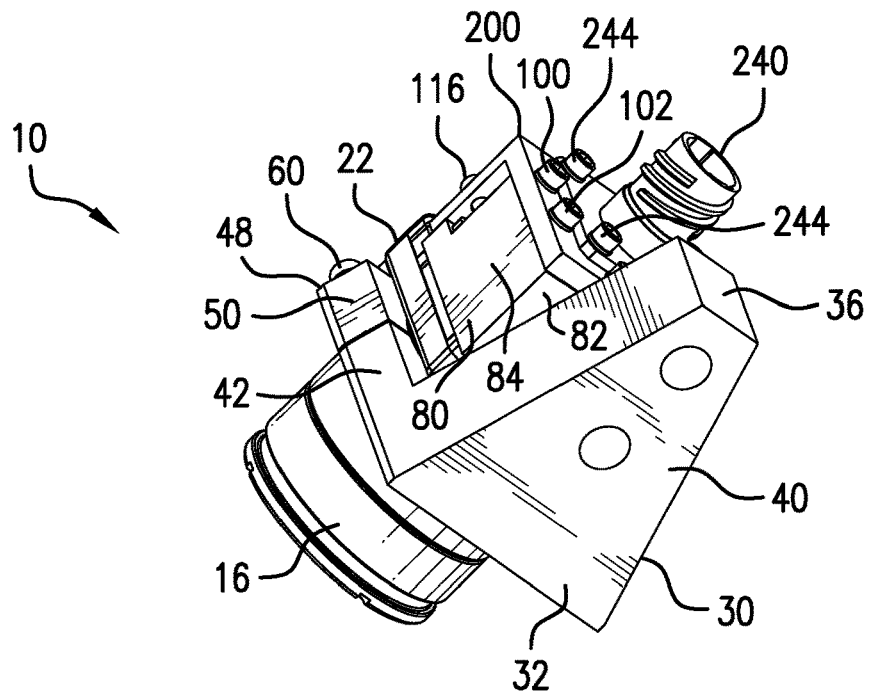
FIG. 9 is a bottom view, in perspective, of the ruggedized miniaturized infrared camera system.
Figure 10:
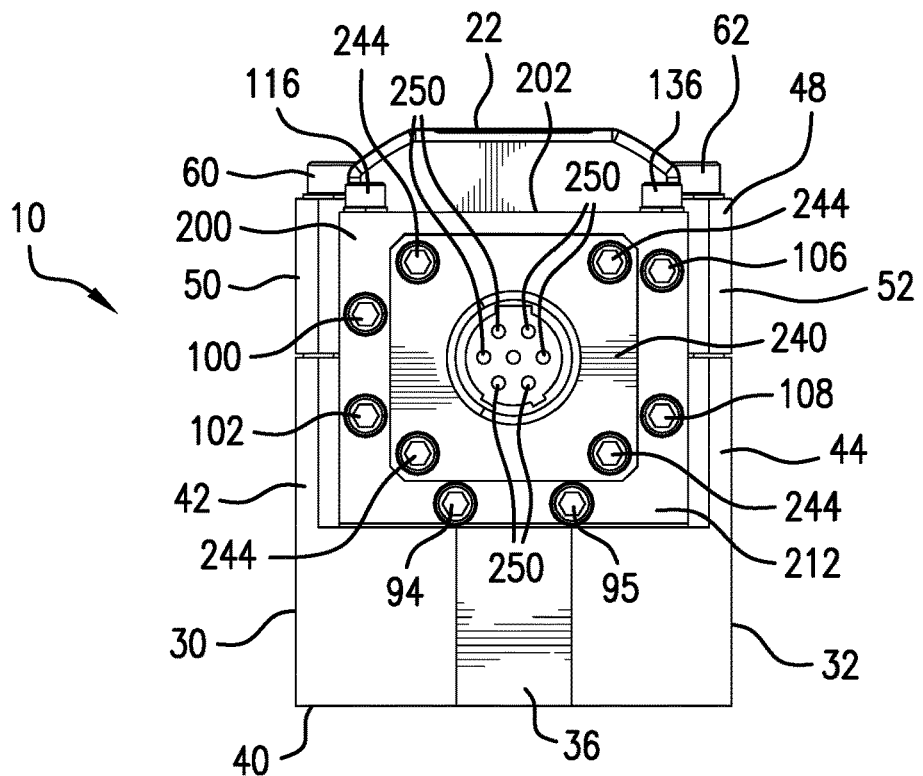
FIG. 10 is a rear elevational view of the ruggedized miniaturized infrared camera system.

As shown in FIGS. 1, 5 and 8A, upstanding wall section 84 has a notched-out region 110 that has a curvature that corresponds to the curvature of screw 112. Threaded screw inlet 114 is located in notched-out region 110 and is sized for receiving screw 116. Screw 116 is used to attach or join top section 202 of interface bracket 200 to camera housing support structure 80. Upstanding wall section 84 includes portion 118 that is contiguous with notched-out region 110. Portion 118 has through-hole 120 that is sized to receive screw 112. Screw 112 extends through the through-hole 120 and is threadedly engaged with threaded screw inlet 130 in camera housing 22 (see FIG. 8B). In this embodiment, upstanding wall section 86 does not have a notched-out region such as notched-out region 110. Instead, upstanding wall section 86 has a substantially flat surface 132 and threaded screw inlet 134. Threaded screw inlet 134 is configured to receive screw 136. Screw 136 is one of the screws that are used to attach or join top section 202 of interface bracket 200 to support structure 80.

Referring to FIGS. 5, 8A and 8B, camera housing support structure 80 includes a pair of channels 140 and 142. Channel 140 is formed at the junction of horizontal bottom section 82 and upstanding wall section 84. Similarly, channel 142 is formed at the junction of bottom section 82 and upstanding wall section 86. Upstanding wall sections 84 and 86 have through-holes at the end of channels 140 and 142. For example, upstanding wall section 86 has through-hole 144 that is at the end of channel 142 and is configured to receive screw 146 (see FIGS. 5 and 8B). Screw 146 extends through the through-hole 144 and is threadedly engaged with a corresponding threaded screw inlet (not shown) in camera housing 22. This threaded screw inlet to which screw 146 is threadedly engaged is similar to the threaded screw inlet 130 (see FIG. 5) which is in camera housing 22. Similarly, upstanding wall section 84 has through-hole (not shown) that is at the end of channel 140 and is configured to receive screw 148 (see FIGS. 5 and 8B). Screw 148 extends through this through-hole at the end of channel 140 and is threadedly engaged with a corresponding threaded screw inlet 150 in camera housing 22. Referring to FIGS. 8A and 8B, counter-bore 109 is sized to receive screw 152. Screw 152 extends through counter-bore 109 and is threadedly engaged with a corresponding threaded screw inlet (not shown) in camera housing 22. The threaded screw inlet in camera housing 22 that receives screw 152 is substantially identical to threaded screw inlets 130 and 150 in camera housing 22 (see FIG. 5). Therefore, infrared camera module 12 is secured and attached to camera housing support structure 80 by screws 112, 146, 148 and 152, and is also secured and attached to base portion 32 by lens clamp member 48 and screws 60 and 62 (see FIG. 8B). Each screw 112, 146, 148 and 152 is fabricated from passivated stainless steel and is configured with a socket head. In an exemplary embodiment, each screw 112, 146, 148 and 152 is a military standard NA0069A016008 A286 Stainless Steel Socket Head Cap Screw. Rugged camera mount 30 is fabricated from durable aerospace-grade materials. In an exemplary embodiment, ruggedized camera mount 30 is fabricated from aerospace-grade metals, such as aerospace grade aluminum, steel, stainless steel, nickel and Titanium.

Referring to FIGS. 1-7, 9 and 10, ruggedized miniaturized infrared camera system 10 further comprises interface bracket 200. Interface bracket 200 may be fabricated from any of the aforementioned durable aerospace-grade metals. In exemplary embodiment, interface bracket 200 is fabricated from aerospace-grade aluminum. Top section 202 of interface bracket 200 has through-holes 204 and 206. Through-holes 204 and 206 are configured to receive screws 116 and 136, respectively. Screws 116 and 136 are used to attach or join interface bracket 200 to camera housing support structure 80. Screw 116 is disposed through a corresponding washer 208 and through-hole 204 and threadedly engaged with threaded screw inlet 114 of upstanding wall section 84. Similarly, screw 136 is disposed through a corresponding washer 208 and through-hole 206 and threadedly engaged with threaded screw inlet 134 of upstanding wall section 86. Each screw 116 and 136 is fabricated from passivated stainless steel and is configured with a socket head. In an exemplary embodiment, each screw 116 and 136 is a military standard NA0069A016008 A286 Stainless Steel Socket Head Cap Screw. Each washer 208 is configured as a flat washer and fabricated from passivated stainless steel. In an exemplary embodiment, each washer 208 is a military standard NAS620C4 flat washer. Referring to FIG. 5, interface bracket 200 further comprises side section 212 that is attached and substantially perpendicular to top section 202. Side section 212 has a length that is greater than the length of top section 202 such that interface bracket 200 is substantially "L" shaped. Side section 212 has an interior side and an exterior side. Side section 212 has a plurality of through-holes 214. Screw 94 is disposed through a corresponding washer 208 and corresponding through-hole 214 and threadedly engaged with threaded screw inlet 90 in horizontal bottom section 82 of camera housing support structure 80. Screw 95 is disposed through a corresponding washer 208 and corresponding through-hole 214 and threadedly engaged with threaded screw inlet 92 in horizontal bottom section 82 of camera housing support structure 80 (see FIGS. 5 and 8A). Screw 100 is disposed through a corresponding washer 208 and corresponding through-hole 214 and threadedly engaged with threaded screw inlet 96 in upstanding wall section 84 of support structure 80. Screw 102 is disposed through a corresponding washer 208 and corresponding through-hole 214 and threadedly engaged with threaded screw inlet 98 in upstanding wall section 84 of support structure 80. Similarly, screw 106 is disposed through a corresponding washer 208 and corresponding through-hole 214 and threadedly engaged with threaded screw inlet 103 in upstanding wall section 86 of support structure 80. Screw 108 is disposed through a corresponding washer 208 and corresponding through-hole 214 and threadedly engaged with threaded screw inlet 104 in upstanding wall section 86 of support structure 80 (see FIGS. 5 and 8A). Side section 212 further includes central opening 215, the purpose of which is discussed in the ensuing description Referring to FIGS. 1, 2, 4 and 5, interface bracket 200 has a plurality of threaded screw inlets 230. The purpose of threaded screw inlets 230 is explained in the ensuing description. Infrared camera system 10 further comprises electrical signal connector 240. Connector 240 is a military-standard miniaturized locking connector that is configured to handle various electronic signals including USB2 signals. Connector 240 includes a plurality of electrically conductive pins 250 (see FIG. 4). Connector 240 provides a high-quality impedance match with electrical signal cables (not shown) that are connected between connector 240 and external processing devices (not shown) such as a computer or microprocessor. In an exemplary embodiment, connector 240 is a military standard 805-005-02M8-7PC connector. Connector 240 has a plurality of through-holes 242 for receiving corresponding screws 244. In order to attach or join connector 240 to the exterior side of side section 212, each screw 244 is inserted through corresponding flat washer 246 and corresponding through-hole 242 and threadedly engaged with a corresponding threaded screw inlet 230 in side section 212 of interface bracket 200. In an exemplary embodiment, screws 244 may be realized by any of the particular military-standard screws discussed in the foregoing description. In an exemplary embodiment, washers 246 may be realized by the military-standard washers discussed in the foregoing description.

Ruggedized miniaturized infrared camera system 10 further comprises electronic circuit board 260 and spacer member 262. Electronic circuit board 260 is adjacent to the interior side of side section 212 of interface bracket 200. In an exemplary embodiment, spacer member 262 has a substantially cylindrical shape. Spacer member 262 is fabricated from a non-electrically conductive material. In an exemplary embodiment, spacer member 262 is fabricated from plastic. Spacer member 262 is positioned within central opening 215 in side section 212 of interface bracket 200 and is interposed between electronic circuit board 260 and the rear side of connector 240. A portion of connector 240 extends into spacer member 262 but is spaced apart from electronic circuit board 260 by a gap that defines a predetermined distance. Electrically conductive pins 250 of connector 240 are electrically coupled to electronic circuit board 260. Spacer member 262 has a length that maintains the predetermined distance between electronic circuit board 260 and connector 240. Spacer member 262 also mitigates stress on circuit board 260 caused by solder pins.

Figure 3:
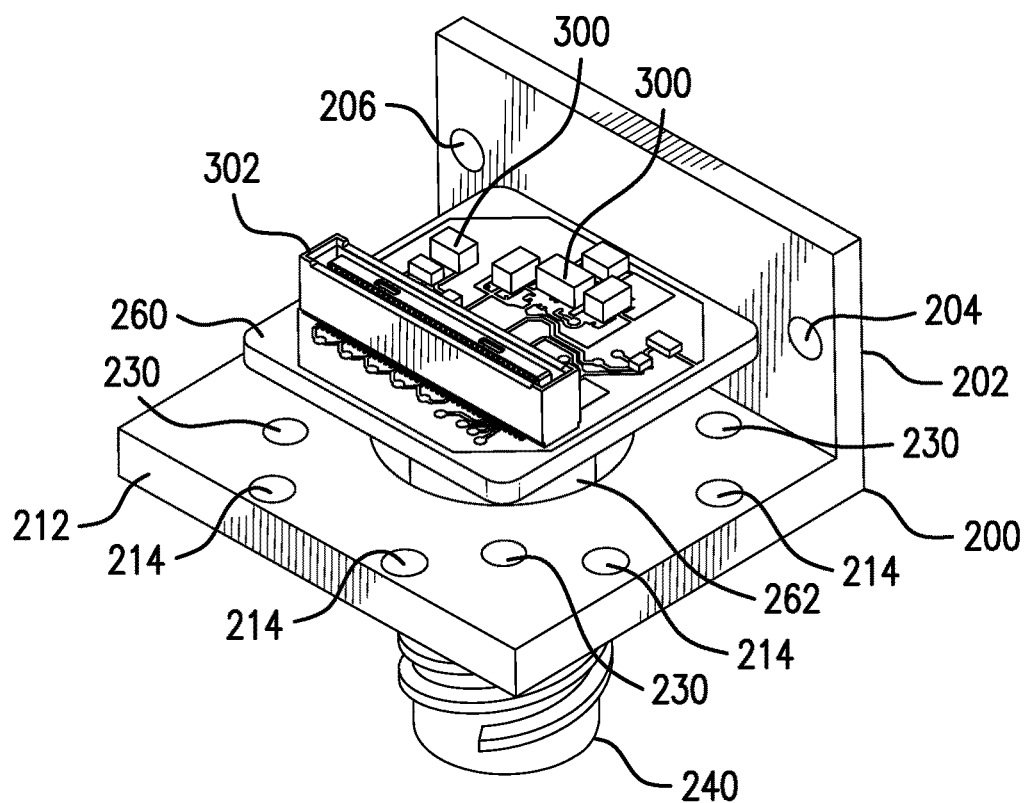
FIG. 3 is a perspective view of an interface bracket that is attached to a camera housing support structure, both of which being shown in FIGS. 1 and 2, the view also showing an electrical signal connector attached to an exterior side of the interface bracket and an electronic circuit board positioned adjacent to an interior side of the interface bracket.
Figure 4:
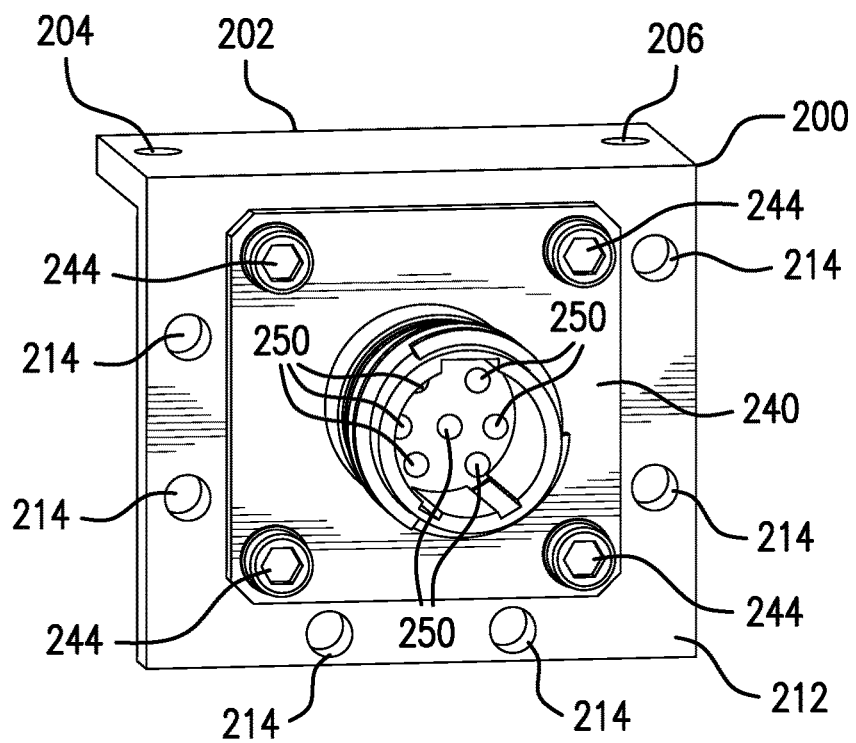
FIG. 4 is a front view, in perspective, of the interface bracket with the electrical signal connector attached to the exterior side.

Referring to FIGS. 3 and 4, various electronic components, collectively referred to by reference number 300, are mounted to electronic circuit board 260. Electronic components 300 include power conversion circuitry. Electrical signal connector 302 is also mounted to electronic circuit board 260 and is electrically coupled to one or more electronic components 300. Electronic signal connector 302 is electrically connected to electronic signal connector 26 on section 24 of camera housing 22. Electronic circuit board 260 provides the appropriate electrical power, via electrical signal connector 26, to camera electronics 25 within section 24. Electronic circuit board 260 also routes electronic signals from electronic signal connector 26 to one or more of electronic components 300. Electronic circuit board 260 electrical couples electronic signals, such as USB2 signals, from one or more of components 300 to electrically conductive pins 250 of connector 240. A staking process is used to mechanically secure electronic components 300 from vibrations and provide a conductive heat path between components 300 and ruggedized camera mount 30. In such a configuration, ruggedized camera mount 30 functions as a heat sink. In an exemplary embodiment, the staking process uses a heat-conductive epoxy. An example of a suitable heat-conductive epoxy is known as Stycast 2850GT. In other embodiments, thermal grease is used instead of a heat-conductive epoxy. Electronic circuit board 260 allows miniaturized infrared camera module 12 to safely operate on vehicle power. The construction, shape and the location of components and electronic circuit board 260 significantly reduce the vulnerability of electronic circuit board 260 to electro-magnetic interference (EMI) and extreme thermal variations.

Ruggedized miniaturized infrared camera system 10 provides quality image data signals while operating in the harsh environments. The particular configurations of ruggedized camera mount 30, ruggedized electronic circuit board 260 and interface bracket 200 significantly improve the removal of heat from infrared camera system 10 thereby providing passive cooling and extending the operational life of infrared camera system 10 in a vacuum. The aerospace grade aluminum from which ruggedized camera mount 30 is fabricated and the military standard screws and washers cooperate to provide high-integrity mechanical support of infrared camera lens 18 and camera housing 22. The electrical components and mechanical components are strategically positioned to minimize mechanical gaps and reduce mass and volume allocation. All mechanical and electrical components of infrared camera system 10 have relatively low contamination properties thereby eliminating or substantially reducing off-gassing and improving vacuum compatibility and optical clarity. Therefore, ruggedized miniaturized infrared camera system 10 is able to withstand stringent launch load environments and low earth-orbit environments and is ideal for use on aircraft, rockets, space stations, satellites or cube-satellites.

The foregoing description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. In this regard, while the disclosed subject matter has been described in connection with various embodiments and corresponding Figures, where applicable, it is to be understood that other similar embodiments can be used or modifications and additions can be made to the described embodiments for performing the same, similar, alternative or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A ruggedized miniaturized infrared camera system for aerospace environments, comprising:
   a ruggedized camera mount comprising:
      a base having a camera lens receiving surface that has a shape that corresponds to a camera lens,
      a lens clamp member removably attached to the base and configured to clamp a camera lens to the base, the lens clamp member having a camera lens contact surface that is aligned with the camera lens receiving surface, and
      a camera housing support structure comprising a bottom section attached to the base and a pair of upstanding wall sections attached to the bottom section and spaced apart so as to provide a space for receiving a camera housing, wherein the space is aligned with the camera lens receiving surface;
   a miniaturized infrared camera module comprising a lens and a housing, wherein the lens is clamped between the camera lens receiving surface and the camera lens contact surface by the lens clamp member and wherein the housing is positioned between and attached to the upstanding wall sections and attached to the camera housing support structure, the miniaturized infrared camera module further comprising camera electronics within the housing and a camera module electrical signal connector attached to the housing and in electronic signal communication with the camera electronics;
   an interface assembly comprising:
      an "L" shaped interface bracket attached to the upstanding wall sections and having a first side facing the housing of the camera module and an opposite second side, and
      an interface assembly electrical signal connector attached to the opposite second side of the interface bracket; and
      electronic circuitry to route electrical signals from the camera module electrical signal connector to the interface assembly electrical signal connector.

2. The ruggedized miniaturized infrared camera system according to claim 1 wherein the housing of the camera is attached to the pair of upstanding wall sections and the bottom section of the camera housing support structure.

3. The ruggedized miniaturized infrared camera system according to claim 1 wherein the base has a top side and a bottom side and wherein the camera housing support structure is attached to the top side.

4. The ruggedized miniaturized infrared camera system according to claim 3 wherein the base further comprises a front section having a curved portion that defines the camera lens receiving surface.

5. The ruggedized miniaturized infrared camera system according to claim 1 wherein:
   the interface bracket has a first section attached to the top portion of each upstanding wall section such that the first section extends over the camera housing positioned within the space between the upstanding wall sections, the interface bracket having a second section that is substantially perpendicular to the first section and which is attached to the upstanding wall sections, wherein the second section has an opening therethrough, and;
   wherein the ruggedized miniaturized infrared camera system further comprises
   a hollow electrically non-conductive spacer member having a portion thereof within the opening in the second section of the interface bracket, wherein a portion of the interface assembly electrical signal connector extends into the spacer member.

6. The ruggedized miniaturized infrared camera system according to claim 5 wherein the hollow electrically non-conductive spacer member has a substantially cylindrical shape.

7. The ruggedized miniaturized infrared camera system according to claim 5 wherein the hollow electrically non-conductive spacer member is fabricated from plastic.

8. The ruggedized miniaturized camera system according to claim 5 wherein the first section of the interface bracket has a first length and the second section of the interface bracket has a second length that is greater than the first length such that the interface bracket is substantially "L" shaped.

9. The ruggedized miniaturized infrared camera system according to claim 1 wherein the interface assembly electrical signal connector is configured to transfer USB2 signals from the electronic circuitry to an external electrical signal cable that is electrically connected to the interface assembly electrical signal connector.

10. The ruggedized miniaturized infrared camera system according to claim 1 wherein the base and the interface bracket are fabricated from aerospace-grade aluminum.

11. A ruggedized miniature infrared camera system for aerospace environments comprising:
   a ruggedized camera mount comprising:
      a base comprising a top side, a bottom side and a front section having a curved portion that defines a camera lens receiving surface,
      a lens clamp member removably attached to the front section of the base and configured to clamp a camera lens to the base, the lens clamp member having a camera lens contact surface that is aligned with the camera lens receiving surface, and
      a camera housing support structure comprising a bottom portion attached to the top side of the base and a pair of upstanding wall portions attached to the bottom portion and spaced apart so as to provide a space for receiving a camera housing, wherein the space between the upstanding wall portions is aligned with the camera lens receiving surface, each upstanding wall portion having a top portion;
   a miniaturized infrared camera module comprising a lens, a housing, camera electronics within the housing and a first electrical signal connector attached to the housing and in electrical signal communication with the camera electronics, the lens being clamped between the camera lens receiving surface and the camera lens contact surface by the lens clamp member, the housing being positioned within the space between the upstanding wall portions and attached to the camera housing support structure, the miniaturized infrared camera module further comprising camera electronics within the housing and a camera module electrical signal connector attached to the housing and in electronic signal communication with the camera electronics;
   an interface assembly comprising:
      an "L" shaped interface bracket attached to the upstanding wall sections and having a first side facing the housing of the camera module, an opposite second side and an opening,
      an interface assembly electrical signal connector attached to the opposite second side of the interface bracket, and
      a hollow electrically non-conductive spacer member having a portion thereof within the opening of the interface bracket, wherein a portion of the interface assembly electrical signal connector extends into the spacer member; and
      an electronic circuit board adjacent to first side of the interface bracket and being in electrical signal communication with the interface assembly electrical signal connector and the camera module electrical signal connector.

12. The ruggedized miniature infrared camera system according to claim 11 wherein:
   the interface bracket has a first section attached to the top portion of each upstanding wall portion such that the first section extends over the camera housing positioned between the upstanding wall portions, the interface bracket having a second section that is substantially perpendicular to the first section and which is attached to the upstanding wall portions.

13. The ruggedized miniaturized infrared camera system according to claim 11 wherein the interface assembly electrical signal connector is configured to transfer USB2 signals from the electronic circuit board to an external electrical signal cable that is connected to the interface assembly electrical signal connector.

14. A ruggedized camera mount for aerospace environments comprising:
   a base portion having a front end, a rear end, a top side and bottom side, the front end comprising a pair of spaced apart upstanding portions and a camera lens receiving surface that is contiguous with the spaced apart upstanding portions and which has a curvature that corresponds to the curvature of a camera lens;
   a lens clamp member removably attached to the pair of spaced apart upstanding portions and having a camera lens contact surface which has a curvature that corresponds to a curvature of a camera lens, whereby when the camera lens is positioned on the camera lens receiving surface of the base portion, the lens clamp member clamps the camera lens between the camera lens receiving surface and the camera lens contact surface;
   a camera housing support structure comprising a bottom portion attached to the top side of the base portion and a pair of upstanding sections attached to the bottom portion and spaced apart so as to provide a space for receiving a camera housing, wherein the space is aligned with the camera lens receiving surface of the base portion;
   an interface assembly comprising:
      an "L" shaped interface bracket attached to the upstanding sections of the camera housing support structure and having a first side facing the camera housing of a camera module and an opposite second side, and
      an interface assembly electrical signal connector attached to the opposite second side of the interface bracket; and
   electronic circuitry to route electrical signals from a camera module electrical signal connector of the camera module to the interface assembly electrical signal connector.

15. The ruggedized camera mount according to claim 14 wherein the pair of upstanding sections of the camera housing support structure are substantially parallel to each other and substantially perpendicular to the bottom portion.

16. The ruggedized camera mount according to claim 14 wherein the lens clamp member is fastened to the pair of spaced apart upstanding portions of the base portion.

* * * * *